United States Patent
Pomaranski et al.

(10) Patent No.: US 8,812,781 B2
(45) Date of Patent: Aug. 19, 2014

(54) EXTERNAL STATE CACHE FOR COMPUTER PROCESSOR

(75) Inventors: Ken G. Pomaranski, Roseville, CA (US); Andrew H. Barr, Roseville, CA (US); Dale J. Shidla, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2566 days.

(21) Appl. No.: 11/109,353

(22) Filed: Apr. 19, 2005

(65) Prior Publication Data

US 2006/0236034 A1  Oct. 19, 2006

(51) Int. Cl.
*G06F 12/00* (2006.01)
*G06F 11/20* (2006.01)
*G06F 11/14* (2006.01)

(52) U.S. Cl.
CPC ........ *G06F 11/2043* (2013.01); *G06F 11/2097* (2013.01); *G06F 11/1405* (2013.01)
USPC ............................. 711/118; 711/154; 711/103

(58) Field of Classification Search
USPC .................. 711/118, 154, 103; 714/11, 13, 15
See application file for complete search history.

(56) References Cited

U.S. PATENT DOCUMENTS

| | | | |
|---|---|---|---|
| 5,386,552 A | | 1/1995 | Garney |
| 5,784,628 A | * | 7/1998 | Reneris ........................ 713/300 |
| 6,021,466 A | * | 2/2000 | Olarig ........................... 711/122 |
| 6,708,288 B1 | | 3/2004 | Ziegler et al. |
| 7,363,411 B2 | * | 4/2008 | Kobayashi et al. .......... 710/261 |
| 2002/0144177 A1 | * | 10/2002 | Kondo et al. .................. 714/13 |
| 2002/0144777 A1 | | 10/2002 | Kong et al. |
| 2003/0005238 A1 | * | 1/2003 | Pawlowski .................... 711/146 |
| 2003/0056143 A1 | * | 3/2003 | Prabhu ........................... 714/13 |
| 2004/0111572 A1 | | 6/2004 | Arimilli et al. |
| 2006/0010344 A1 | * | 1/2006 | Zorek et al. .................... 714/13 |

FOREIGN PATENT DOCUMENTS

| | | |
|---|---|---|
| EP | 0750259 | 5/2002 |
| GB | 1163859 | 9/1969 |
| WO | WO95/34860 | 12/1995 |

* cited by examiner

*Primary Examiner* — Matthew Bradley

(57) ABSTRACT

A processor can write its state to an external state cache. Thus, in the event of a processor failure, the stored state can be read and assumed, either by the original processor or another processor. Thus, a process can be resumed from the stored state rather than reconstructed from initial conditions.

16 Claims, 2 Drawing Sheets

EXTERNAL STATE CACHE FOR COMPUTER PROCESSOR

BACKGROUND OF THE INVENTION

The present invention relates to computers and, more particularly, to high-availability computing. In this specification, related art labeled "prior art" is admitted prior art; related art not so labeled is not admitted prior art.

High-availability computers are used for applications where the normal amount of downtime suffered by a computer is unacceptable. High-availability computers use redundancy to provide backups for many components such as processors, memory, I/O (input/output) interfaces, power supplies, and disk storage. When one component fails, another similar component is available to take over its function. One approach is to operate identical components in parallel so that if one fails, data is preserved and there is little time lost in switching over from the failed component. Of course, there can be a performance penalty when two components are, in effect, doing the work of one.

SUMMARY OF THE INVENTION

The present invention, as defined in the claims, provides for external state caching for a processor or set of processors. If a processor fails, its state is preserved so that the state can be resumed by another processor or by the original processor once the problem associated with the failure has been handled. Since the state has been preserved, it is not necessary to return to the beginning of a process to recreate the state. State preservation does not require a second processor, so the waste associated with running two processors in lock-step is avoided. These and other features and advantages of the invention are apparent from the description below with reference to the following drawings.

DETAILED DESCRIPTION

Figure 1:
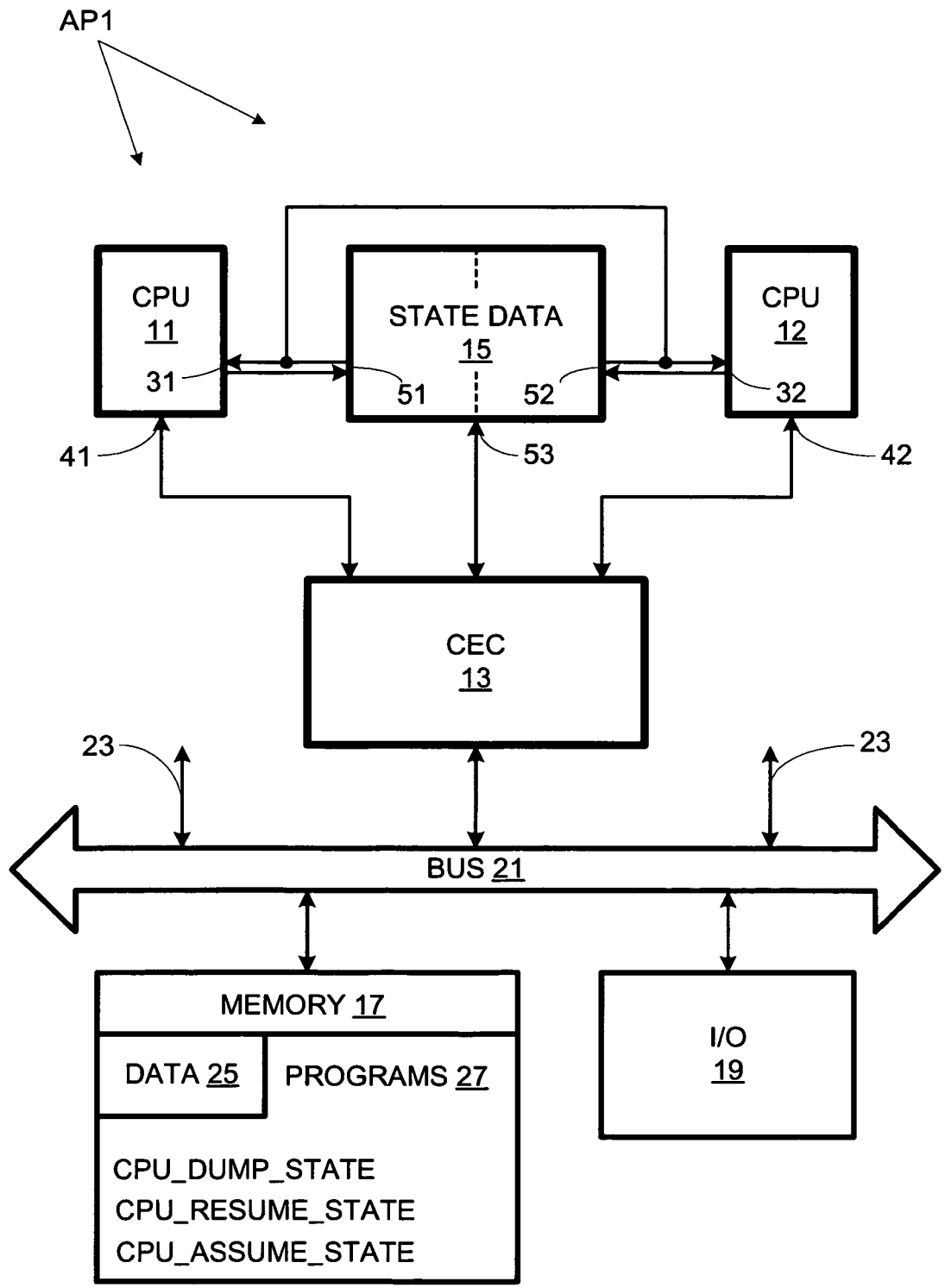
FIG. 1 is a schematic block diagram of one of many possible systems provided for by the invention.

A computer system AP1 in accordance with the present invention comprises a pair of processors 11 and 12, a core electronics component (CEC) 13, an external state cache 15, system memory 17, and I/O devices 19, all coupled by a network fabric illustrated in FIG. 1 as a bus 21. Connections 23 to bus 21 can be connected to other processor sets and other computer components. System memory 17 holds data 25 and programs 27, including an operating system.

Processors 11 and 12 share external state cache 15; they are not run in lock-step. A variation of the illustrated embodiment permits processors sharing an external state cache to run alternatively in lock-step and non-lock-step modes. External state cache 15 is also coupled to CEC 13 for transferring state data to other processor sets. In other embodiments, an external state cache is coupled to only one processor, or to more than two processors.

In system AP1, external state cache 15 is coupled to both processors 11 and 12 at dedicated state-dump ports 31 and 32 respectively. The use of dedicated state-dump ports 31 and 32 that are independent of respective system interfaces 41 and 42 minimizes the performance impact of state dumps. Each processor writes its state data, e.g., cache contents, registers, program pointer, to a respective section of external state cache 15. This writing can be periodic as directed by hardware, or in response to program instructions.

External state cache 15 has a first port 51 for receiving state dumps from processor 11 via its state-dump port 31; port 51 is coupled to state dump ports 31 and 32 of both processors 11 and 12 to provide access thereto to state data written by processor 11. External state cache 15 has a second port 52 for receiving state dumps from processor 12 via its state-dump port 31; port 52 is coupled to state dump ports 31 and 32 of both processors 11 and 12 to provide access thereto to state data written by processor 11. External state cache 15 has a further system port 53 so that CEC 13 can read from and write states to external state cache 15. Thus, CEC 13 can transfer state data, e.g., from other processor sets, to either processor 11 or processor 12 via external state cache 15. In alternative embodiments, a CEC can transfer state data directly to processors; in other embodiments, an external state cache is coupled to the incorporating system through a path not including a CEC.

Among the instructions included in programs 27 is a "CPU_dump_state" instruction. Processor 11, when executing this instruction, writes its state to the respective section of external state cache 15. Programs 27 also include "CPU_resume_state" and "CPU_assume_state" instructions. Processor 11, when executing a "CPU_resume_state" instruction, reads and adopts a state stored in the respective section of external state cache 15; processor 11, when executing a "CPU_assume_state" instruction, reads and adopts a state stored in the non-respective section of external state cache 15 (in other words, the processor adopts a state written by the other processor). Others instructions can be used to enable or disable automatic state dumps and set their frequency.

In the absence of an explicit instruction, state dumps are controlled by hardware. By default, state dumps occur at regular intervals. The regular interval can be increased or decreased based on a determination, in this case by CEC 13, of a likelihood of failure, e.g., based on a number of detected correctable and uncorrectable errors, detected voltage rail droops, etc. The regular interval can be cut short upon prediction of an imminent failure. A state dump can also be omitted or delayed based on other demands on the processor. For example, a state dump can be omitted or delayed to avoid synchronization issues.

The need for omitting or delaying state dumps is minimized by the use of dedicated state-dump ports 31 and 32 dedicated to external state cache 15. Since external state ports 31 and 32 are separate from the normal system interface ports 41 and 42, they allow state dumping to proceed without significant performance issues because normal system bandwidth is not consumed.

The frequency of state dumps can be set, for example, as a function of factors relating generally to a tradeoff of need for high availability and performance or power. While using a dedicated state-dump port alleviates most of the performance overhead, there can still be some overhead associated with specific state dump instructions, so fewer state dumps can be called for when performance is critical. There can also be some synchronization overhead associated with a state dump so state dumps can be performed less frequently to ensure synchronicity. In addition, high power consumption can dictate a reduced frequency of state dumps. On the other hand, a processor performing work that requires high reliability can dump state more often.

In computer system AP1, independent power supplies are used for processor 11, processor 12, CEC 13, and external state cache 15. If one power supply fails, the respective component fails, but not the other components. In an alternative embodiment, an external state cache includes non-volatile memory so that the state data it holds is not lost even if its power supply fails temporarily. In another embodiment, the CEC and external state cache can be powered by either of the power supplies for the processors, so that if one power supply fails, its processor fails, but the remaining components remain operational.

Figure 2:
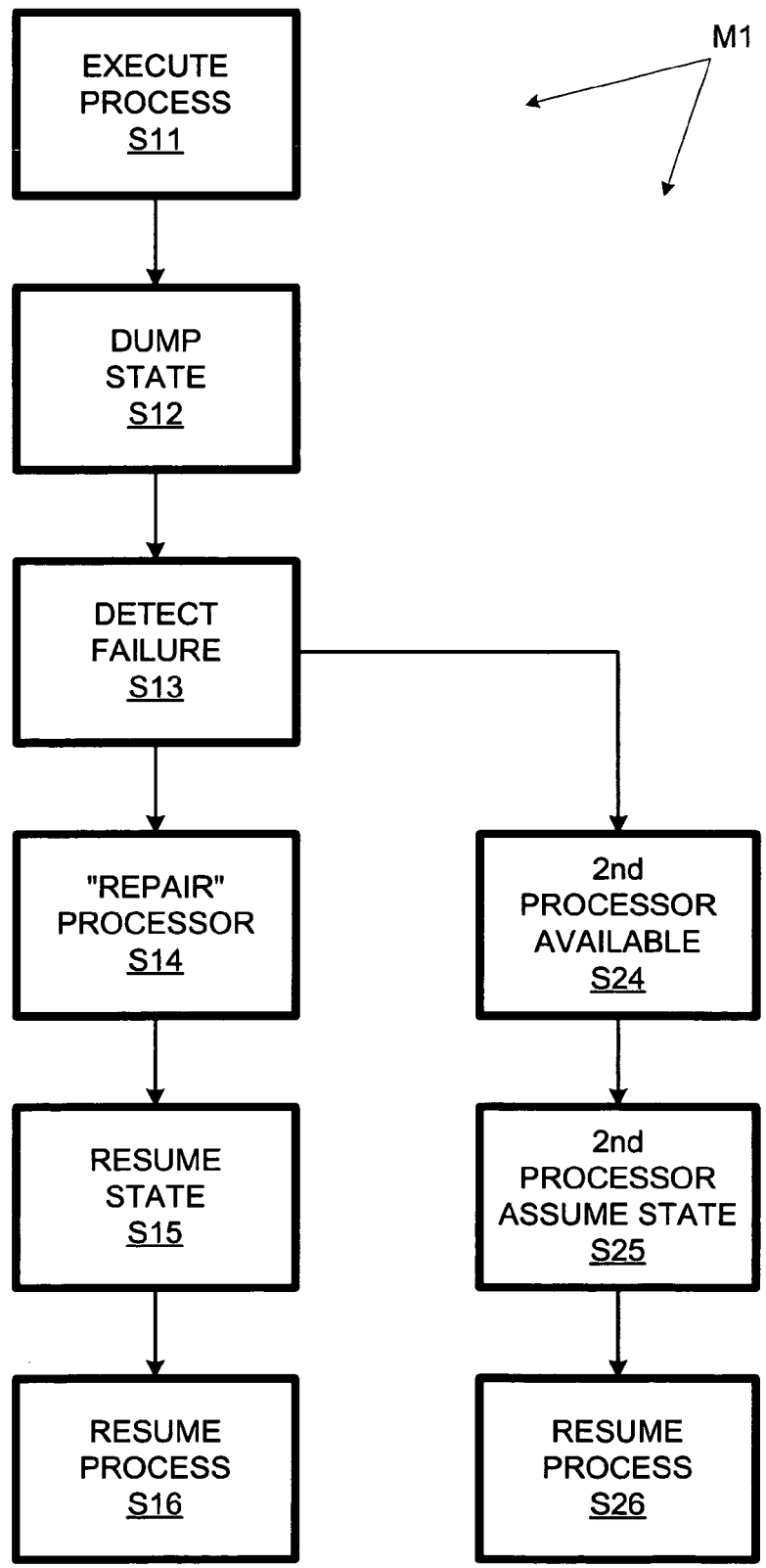
FIG. 2 is a flow chart of one of many possible methods in accordance with the present invention.

A method M1 practiced in the context of system AP1 is flow charted in FIG. 2. At step S11, processor 11 is executing a process conventionally. A step S12, processor 11 writes its state, including on-board (e.g., level 1) cache contents, register contents, and pointer values, to a respective section of external state cache 15. This writing can be in response to an instruction or be in response to a hardware-generated trigger.

At method segment S13, a failure or a potential imminent failure of processor 11 is detected, e.g., by CEC 13. A potential imminent failure can be detected when monitored processor health metrics indicate an unacceptable likelihood of a processor failure.

If processor 11 can be replaced (hot-swapped) or "repaired", e.g., reinitialized, at method segment S14, CEC 13 can command processor 11 to read the last state it or its predecessor wrote at method segment S15, and resume processing at method segment S16. Alternatively, method M1 can proceed to method segment S24. At method segment S24, CEC 13 determines that processor 12 has completed a process it was executing. At method segment S25, CEC 13 directs processor 12 to read the state last written by processor 11. CEC 13 then causes processor 12 to resume the process processor 11 was executing at the time of failure at method segment S26.

In an alternative embodiment, there is one external state cache for one processor. The invention also provides for external state caches with more than one section per processor. A processor can write to its sections in alternation so that the presently written state does not overwrite the immediately preceding state. Thus, if a failure occurs during a state dump so that the dumped state data is corrupted, an intact preceding state is available for resuming a process. Alternatively, state cache sections can be filled on a round-robin basis by different processors so that previous states can be preserved without requiring multiple sections per processor. These and other variations upon and modifications to the illustrated embodiment are provided for by the present invention, the scope of which is defined by the following claims.

What is claimed is:

1. A system comprising:
   an external state cache including a first port coupled to a first processor and a system port for communicating with an incorporating system; and
   said first processor for writing its state to said external state cache;
   main memory; and
   a system bus via which said processor communicates with said main memory, said processor communicating with said external state cache but not via said system bus.

2. A system as recited in claim 1 wherein said first processor has a system interface for communicating with an incorporating system and a separate port for communicating with said external state cache.

3. A system as recited in claim 2 wherein said system interface is connected to a core electronics component.

4. A system as recited in claim 1 further comprising a second processor, said external state cache having a second port coupled to said second processor and not to said first processor so that said second processor can communicate directly with said external state cache and not via said system bus.

5. A system as recited in claim 1 wherein said first processor writes its state to said external state cache in response to a program instruction.

6. A system as recited in claim 1 wherein said first processor can assume a state it reads from said external state cache.

7. A system as recited in claim 1 further comprising a second processor that can assume a state it reads from said external state cache that was written to said external state cache by said first processor.

8. A system as recited in claim 7 wherein said external state cache can hold states of both of said processors concurrently.

9. A method comprising:
   a processor assuming a state while processing program instructions;
   a processor writing its state to an external state cache directly and not through a system bus, wherein said external state cache has a first port coupled to said processor and a system port for communications with an incorporating system.

10. A method as recited in claim 9 wherein said first processor writes its state to said external state cache in response to a program instruction.

11. A method as recited in claim 9 further comprising monitoring processor health metrics for forming an evaluation of a likelihood of an imminent processor failure can be evaluated, said writing occurring at least in part as a function of said evaluation.

12. A method as recited in claim 11 where the frequency of writing to said external state cache is dependent on at least one of the following: a likelihood of imminent failure, uptime requirements of an application being run on said processor, performance constraints, and power constraints.

13. A method as recited in claim 9 further comprising said processor reading from said external state cache and assuming said state.

14. A method as recited in claim 13 further comprising a second processor reading from said external state cache and assuming said state.

15. A method as recited in claim 14 wherein said external state cache can concurrently hold states written by said first and second processors.

16. A computer product comprising non-transitory computer-readable storage media encoded with code including:
   a dump-state instruction that when executed by a processor causes said processor to transfer its state data to an external state cache; and
   an assume-state instruction that when executed by said processor causes said processor to read and assume a state from said external state cache that another processor had previously written to said external state cache, wherein said external state cache includes a first port coupled to said processor and a system port for communications with an incorporating system.

* * * * *